United States Patent
Jung (10) Patent No.: US 10,819,114 B2
(45) Date of Patent: Oct. 27, 2020

(54) SUBMODULE THAT IS CAPABLE OF CONNECTING CAPACITOR AND POWER PACK EASILY

(71) Applicant: LSIS CO., LTD., Anyang-si, Gyeonggi-do (KR)

(72) Inventor: Teagsun Jung, Anyang-si (KR)

(73) Assignee: LSIS CO., LTD., Anyang-si, Gyeonggi-Do (KR)

( * ) Notice: Subject to any disclaimer, the term of this patent is extended or adjusted under 35 U.S.C. 154(b) by 0 days.

(21) Appl. No.: 16/286,814

(22) Filed: Feb. 27, 2019

(65) Prior Publication Data

US 2019/0296527 A1 Sep. 26, 2019

(30) Foreign Application Priority Data

Mar. 26, 2018 (KR) .................. 10-2018-0034683

(51) Int. Cl.
| | |
|---|---|
| *H02J 3/18* | (2006.01) |
| *H01R 25/16* | (2006.01) |
| *H01R 25/14* | (2006.01) |
| *H01G 2/02* | (2006.01) |
| *H01G 2/00* | (2006.01) |
| *H02G 5/00* | (2006.01) |

(52) U.S. Cl.
CPC ............. *H02J 3/18* (2013.01); *H01G 2/00* (2013.01); *H01G 2/02* (2013.01); *H01R 25/145* (2013.01); *H01R 25/162* (2013.01); *H02G 5/007* (2013.01)

(58) Field of Classification Search
CPC ...... H01R 25/16; H01R 25/161; H01R 25/14; H01R 25/142; H01R 25/145; H01R 25/162; H02G 5/007; H02B 1/04; H02B 1/20; H02J 3/18; H01G 2/02; H01G 2/00

USPC .................. 439/114–115, 212–213
See application file for complete search history.

(56) References Cited

U.S. PATENT DOCUMENTS

| | | | | |
|---|---|---|---|---|
| 5,086,372 A | * | 2/1992 | Bennett .............. | H01R 12/7088 361/622 |
| 7,626,824 B2 | * | 12/2009 | Meier .................... | H05K 7/209 165/80.3 |
| 2017/0271079 A1 | * | 9/2017 | Takahashi .............. | H01G 11/82 |

FOREIGN PATENT DOCUMENTS

| | | |
|---|---|---|
| CN | 101335138 A | 12/2008 |
| CN | 102148579 A | 8/2011 |

(Continued)

OTHER PUBLICATIONS

Korean Office action for related Korean Application No. 10-2018-0034683; action dated Mar. 28, 2019; (4 pages).

(Continued)

*Primary Examiner* — Zachary Pape
(74) *Attorney, Agent, or Firm* — K&L Gates LLP (57) ABSTRACT

A submodule according to the present invention includes a power pack including a plurality of switching modules, first and second input busbars connected to the plurality of switching modules and protruding to a first outer side of the power pack, first and second connection busbars connected to the plurality of switching modules and protruding to a second outer side of the power pack, a capacitor pack including a capacitor element, and first and second connection units provided at both sides of one surface of the capacitor pack. The first and second connection busbars are inserted into the first and second connection units, respectively, such that the power pack and the capacitor pack are electrically connected to each other.

13 Claims, 7 Drawing Sheets

(56) References Cited

FOREIGN PATENT DOCUMENTS

| | | | |
|---|---|---|---|
| CN | 103036452 | A | 4/2013 |
| CN | 205178894 | U | 4/2016 |
| EP | 1469489 | A1 | 10/2004 |
| JP | H0562557 | A | 3/1993 |
| KR | 1019960015125 | B1 | 10/1996 |
| KR | 20130006368 | A | 1/2013 |
| KR | 101389579 | B1 | 4/2014 |
| KR | 101404373 | B1 | 6/2014 |
| KR | 101613812 | B1 | 4/2016 |
| WO | 2017001089 | A1 | 1/2017 |

OTHER PUBLICATIONS

Korean Notice of Allowance for related Korean Application No. 10-2018-0034683; action dated Sep. 27, 2019; (2 pages).
Extended European Search Report for related European Application No. 19161957.6; action dated Sep. 2, 2019; (6 pages).
Chinese Office Action for related Chinese Application No. 201910137803.4; action dated Sep. 3, 2020; (8 pages).

* cited by examiner

SUBMODULE THAT IS CAPABLE OF CONNECTING CAPACITOR AND POWER PACK EASILY

CROSS-REFERENCE TO RELATED APPLICATION

Pursuant to 35 U.S.C. § 119(a), this application claims the benefit of an earlier filing date of and the right of priority to Korean Application No. 10-2018-0034683, filed on Mar. 26, 2018, the contents of which are incorporated by reference herein in its entirety.

BACKGROUND OF THE DISCLOSURE

1. Field of the Disclosure

The present invention relates to a submodule.

2. Description of the Related Art

As industries develop and the population increases, electric power demand increases rapidly, but there is a limit to electric power production.

Accordingly, a power system for stably supplying power generated from a production site to a demand site without a loss is becoming increasingly important.

There is a need for Flexible AC Transmission System (FACTS) facilities for controlling a power flow and improving stability of a system voltage. A STATic synchronous COMpensator (STATCOM), a type of power compensator device called the third generation of the FACTS facilities, is connected to a power system in parallel to compensate for reactive power and active power required by the power system.

Figure 1:
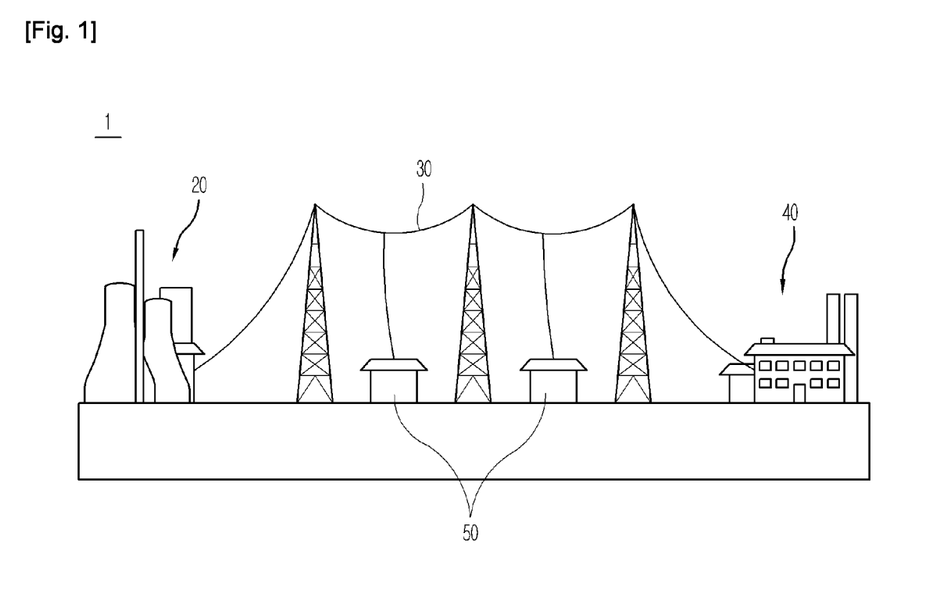
FIG. 1 is a view of a general power system.

FIG. 1 illustrates a general power system.

As illustrated in FIG. 1, a general electric power system 1 may include a power generation source 20, a power grid 30, a load 40, and a plurality of power compensator devices 50.

The power generation source 20 refers to a place or facility for generating electric power, and may be understood as a producer that generates electric power.

The power system 30 may refer to all facilities including a power line, a pylon, a lightning arrester, an insulator, etc., for transmitting power generated in the power generation source 20 to the load 40.

The load 40 refers to a place or facility that consumes power generated in the power generation source 20, and may be understood as a consumer consuming electric power.

The power compensator device 50 is a device that is connected to the power system 30 to compensate for active power or reactive power according to supply or lack of the active power or the reactive power among power flowing to the power system 30.

In recent time, a Modular Multilevel Converter (MMC) type STATCOM facility is increasingly used as the power compensator device 50. The MMC type STATCOM includes a plurality of submodules, which are provided with various devices therein.

Therefore, the related art power compensator device has to include the plurality of submodules, which causes a difficulty in installation in a limited space.

SUMMARY OF THE DISCLOSURE

The present invention is to solve the aforementioned problem and other drawbacks.

Another aspect of the present invention is to provide a submodule having a new compact structure.

Still another aspect of the present invention is to provide a submodule in which a power pack and a capacitor pack can be easily attached and detached.

To achieve the above aspects and other advantages of the present invention, there is provided a submodule according to the present invention includes a power pack including a plurality of switching modules, first and second input busbars connected to the plurality of switching modules and protruding to a first outer side of the power pack, first and second connection busbars connected to the plurality of switching modules and protruding to a second outer side of the power pack, a capacitor pack including a capacitor element, and first and second connection units provided at both sides of one surface of the capacitor pack. The first and second connection busbars may be inserted into the first and second connection units, respectively, so that the power pack and the capacitor pack can be electrically connected to each other.

The effects of the submodule according to the embodiment will be described as follows.

According to at least one of embodiments, connection busbars extending from a power pack can be slidably inserted into connection units coupled to a capacitor pack, thereby facilitating attachment and detachment between the capacitor pack and the power pack.

Further scope of applicability of the embodiments will become apparent from the following detailed description. However, it should be understood that the detailed description and specific examples, while indicating preferred embodiments of the invention, are given by illustration only, since various changes and modifications within the spirit and scope of the invention will become apparent to those skilled in the art from this detailed description.

DETAILED DESCRIPTION OF THE PREFERRED EMBODIMENT

Hereinafter, description will be given in detail of embodiments of the present invention with reference to the accompanying drawings. For the sake of brief description with reference to the drawings, the same or equivalent components will be provided with the same reference numbers, and description thereof will not be repeated. A suffix "module" and "unit" used for constituent elements disclosed in the following description is merely intended for easy description of the specification, and the suffix itself does not give any special meaning or function. In describing the present disclosure, if a detailed explanation for a related known function or construction is considered to unnecessarily divert the gist of the present disclosure, such explanation has been omitted but would be understood by those skilled in the art. The accompanying drawings are used to help easily understand the technical idea of the present disclosure and it should be understood that the idea of the present disclosure is not limited by the accompanying drawings. The idea of the present disclosure should be construed to extend to any alterations, equivalents and substitutes besides the accompanying drawings.

Figure 2:
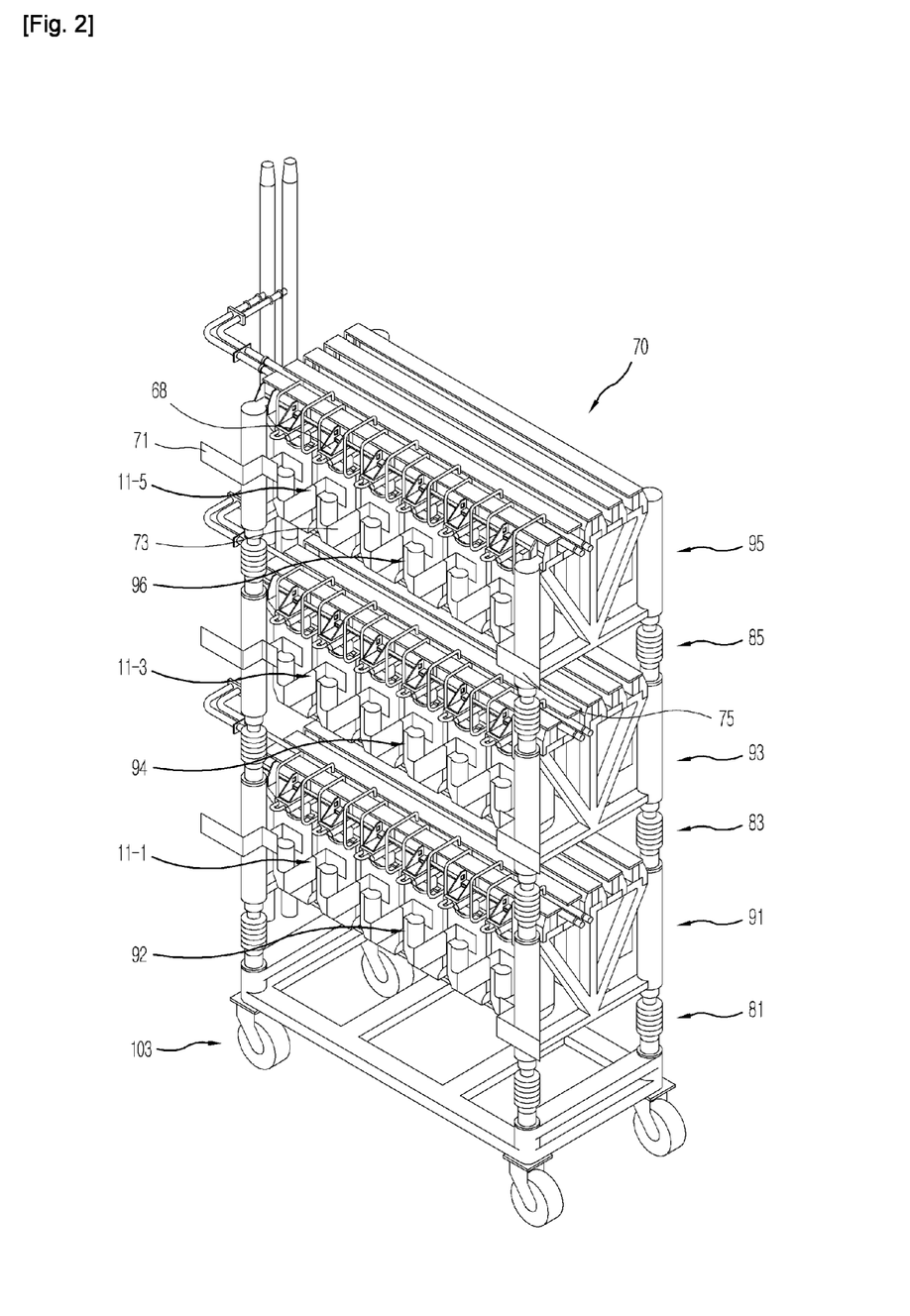
FIG. 2 is a view illustrating an MMC-based power compensator device according to an embodiment.

FIG. 2 is a view illustrating an MMC-based power compensator device according to an embodiment.

Referring to FIG. 2, a power compensator device according to an embodiment may include a plurality of insulating units 81, 83, 85 and a plurality of cabinets 91, 93, 95.

Each of the insulating unit 81, 83, 85 may be a space in which at least one insulator is installed. The cabinets 91, 93 and 95 may be accommodation spaces for accommodating submodule units 11-1, 11-3, 11-5 which are constituted by connecting a plurality of submodules 92, 94 and 96 in series.

The insulating units 81, 83, 85 located between the neighboring cabinets 91, 93, 95 may insulate the submodule units 11-1, 11-3, 11-3 accommodated in the respective cabinets 91, 93, 95.

A first submodule unit 11-1 accommodated in a first cabinet 91 may include a plurality of submodules 92 for converting a voltage of a first phase, for example, an a-phase, among three-phase alternating-current (AC) voltages. A second submodule unit 11-3 accommodated in a second cabinet 93 may include a plurality of submodules 94 for converting a voltage of a second phase, for example, a b-phase, among three-phase AC voltages. A third submodule unit 11-5 accommodated in a third cabinet 95 may include a plurality of submodules 96 for converting a voltage of a third phase, for example, a c-phase, among three-phase AC voltages.

An input busbar 71 may be connected to a first submodule among the plurality of submodules 92. An output busbar 75 may be connected to a last submodule. Connection busbars 73 may be connected to the other submodules.

The respective submodules 92, 94 and 96 are guided into the corresponding cabinets 91, 93 and 95 by guide sliding rail units 68 installed on tops of the cabinets 91, 93 and 95, respectively.

Although three cabinets 91, 93 and 95 and three insulating units 81, 83 and 85 are shown in FIG. 2 for convenience of explanation, the cabinets 91, 93 and 95 and the insulating units 81, 83, and 85 may be variously modified in number according to a user's need, and the scope of the present invention is not limited thereto.

Wheels 103 for moving a frame 70 may be installed on a bottom of the frame 70, but the present invention is not limited thereto.

The wheels 103 may facilitate the frame 70 having a heavy load to be moved to a desired place. If the frame 70 is fixed at a specific place, the wheels 103 may be omitted.

Figure 3:
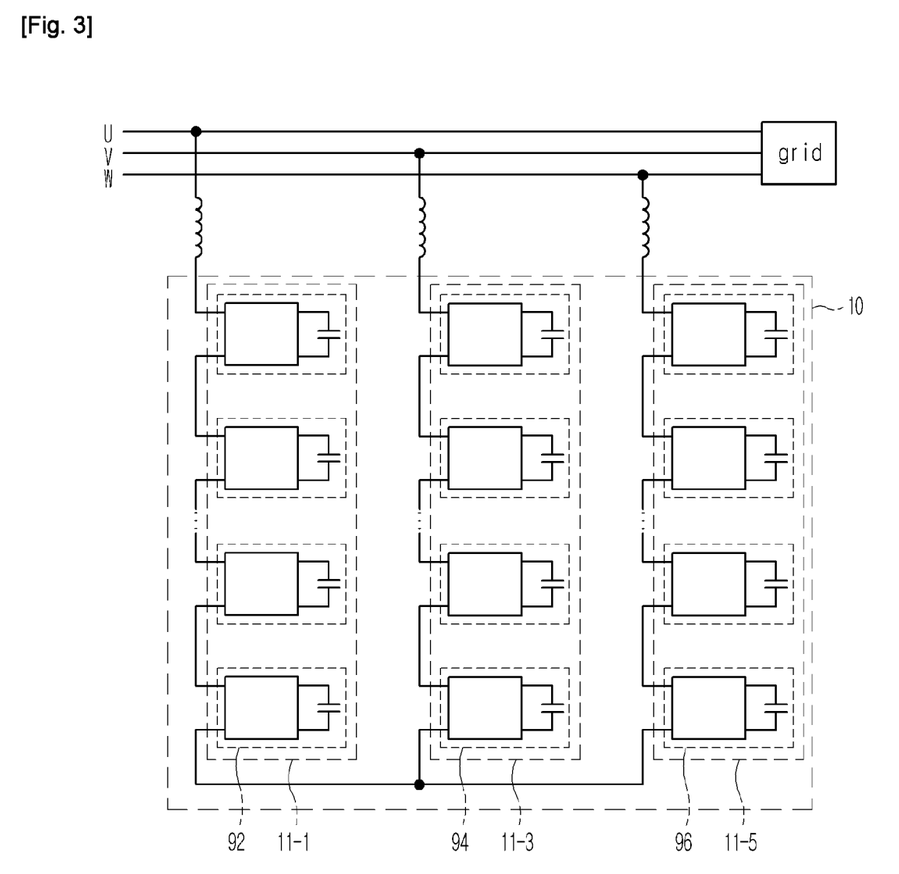
FIG. 3 is a circuit view of an MMC-based power compensator device according to an embodiment.

FIG. 3 is a circuit view of an MMC-based power compensator device according to an embodiment.

As illustrated in FIG. 3, an MMC-based power compensator device 10 may include a plurality of submodules 92, 94, and 96 connected in series for each phase. As the plurality of submodules 92, 94, 96 operate, active power or reactive power may be supplied to the power system or may be absorbed from the power system.

Although FIG. 3 shows a Y-type power compensator device, a A-type power compensator device may alternatively be employed in the present invention.

The plurality of submodules 92, 94, 96 provided on each phase may be defined as one valve, but the present invention is not limited thereto.

Figure 4:
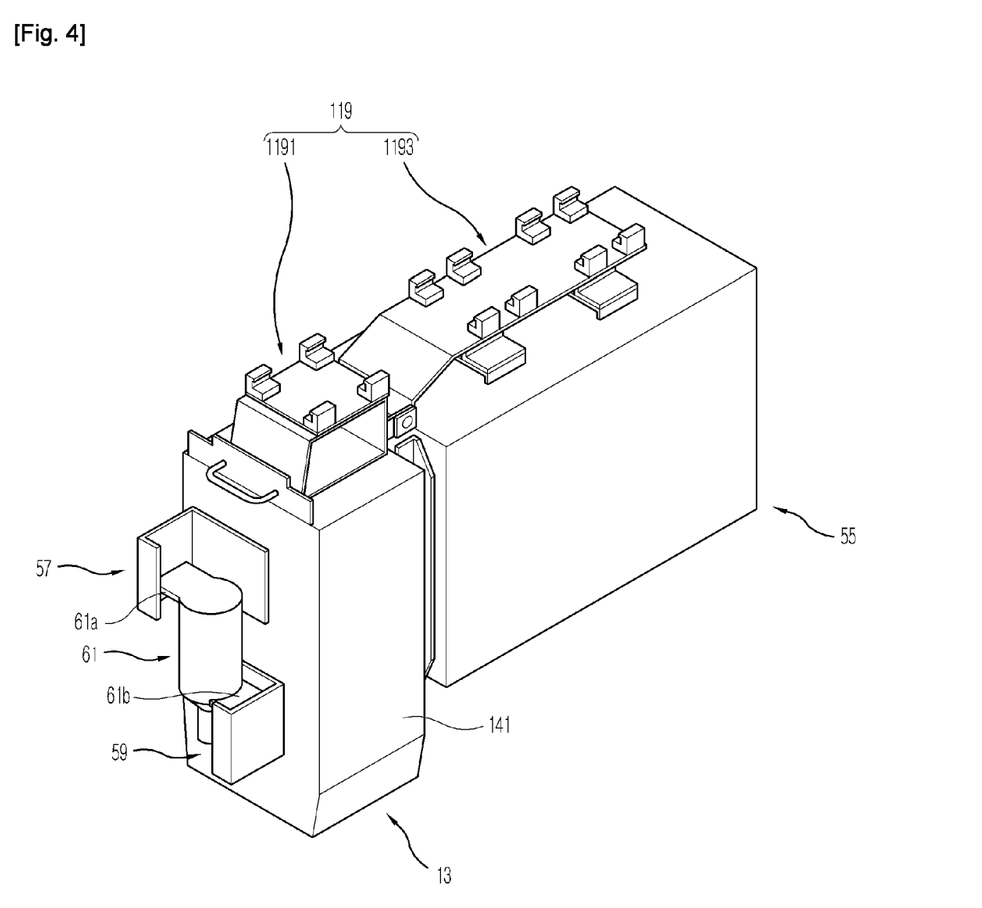
FIG. 4 is a perspective view illustrating a submodule according to an embodiment.
Figure 5:
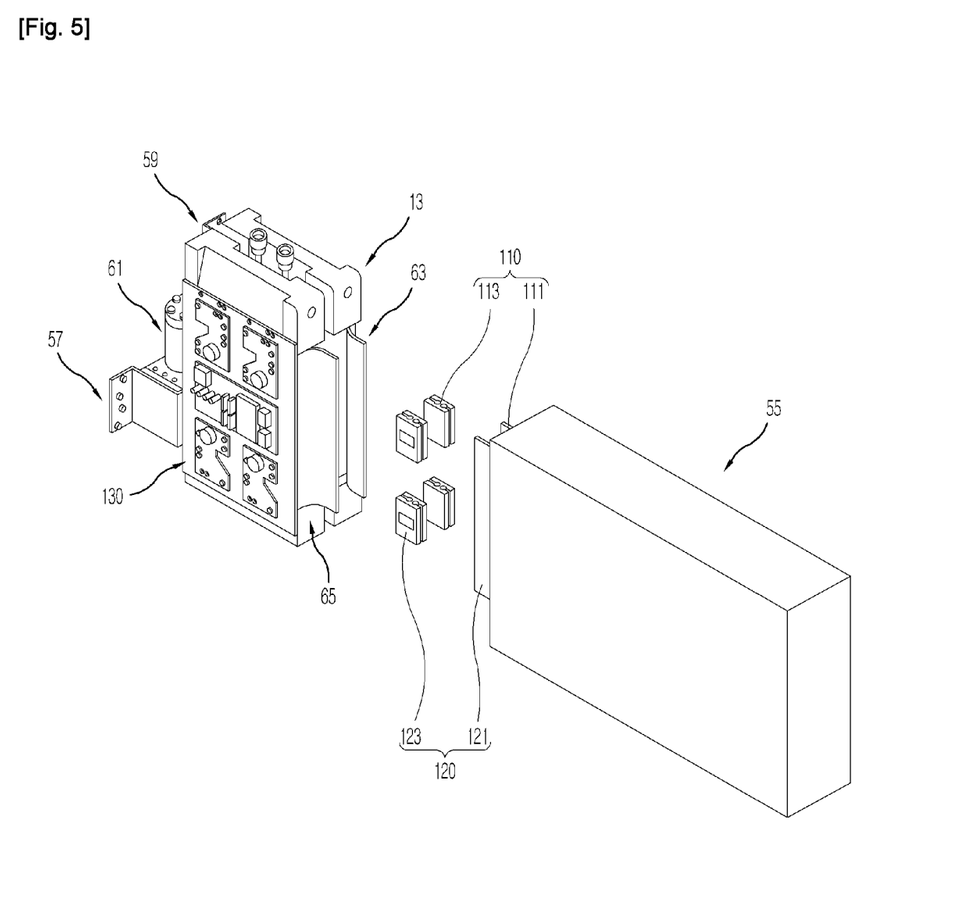
FIG. 5 is an exploded perspective view of a submodule according to an embodiment.

FIG. 4 is a perspective view of a submodule according to an embodiment of the present invention, and FIG. 5 is an exploded perspective view of the submodule according to the embodiment of the present invention.

Referring to FIGS. 4 and 5, each of submodules 92, 94, 96 according to an embodiment may include a power pack 13 and a capacitor pack 55.

The power pack 13 and the capacitor pack 55 may be electrically connected to each other. The capacitor pack 55 may be charged and discharged by a switching operation of the power pack 13.

The capacitor pack 55 may include a case and a capacitor element provided in the case. The capacitor element stores energy (power) to be input to the submodule 92, 94, 96, and this energy may be used as a power source for driving various devices installed in the submodule 92, 94, 96 or may be supplied as reactive power to the power system.

The capacitor pack 55 may be electrically connected to a rear surface of the power pack 13.

The power pack 13 and the capacitor pack 55 may be electrically connected to each other in a sliding manner. That is, the power pack 13 and the capacitor pack 55 may be electrically connected to each other in a manner that first and second connection busbars 63 and 65 provided at a rear end of the power pack 13 are slidably inserted into first and second connection units 110 and 120 provided on a front end of the capacitor pack 55. The sliding manner according to the embodiment will be described later in detail.

First and second input busbars 57 and 59 may be provided in a manner of protruding outward, namely, forward from the power pack 13. The first and second input busbars 57 and 59 may be connected to a plurality of switching modules installed in a case 141 of the power pack 13 through the case 141.

For example, the first input busbar 57 may be electrically connected to first and third switching modules of first to fourth switching modules provided in the power pack 13, and the second input busbar 59 may be electrically connected to second and fourth switching modules of the first to fourth switching modules. A control board 130 for controlling the first to fourth switching modules may be provided in the power pack 13.

The first and second input busbars 57 and 59 may be the connection busbar 73 illustrated in FIG. 2 or may be connected to the connection busbar 73 illustrated in FIG. 2.

Through the first and second input busbars 57 and 59, active power or reactive power absorbed from the power system may be input or energy charged in the capacitor element may be output to the power system as active power or reactive power. The first and second input busbars 57 and 59 may be referred to as first and second input terminals, in other words.

The first and second input busbars 57 and 59 may be electrically connected by a Bypass Switch (BPS) 61. That is, a first switch terminal 61a of the bypass switch 61 may be connected to the first input busbar 57 and a second switch terminal 61b of the bypass switch 61 may be connected to the second input busbar 59.

The bypass switch 61 may be formed long in a cylindrical shape between the first switch terminal 61a and the second switch terminal 61b. The first switch terminal 61a may have a first protrusion protruding from a top of the bypass switch 61 in a first horizontal direction, and the second switch terminal 61b may have a second protrusion protruding from a bottom of the bypass switch 61 in a second horizontal direction opposite to the first horizontal direction.

The first input busbar 57 may be coupled to the first protrusion of the first switch terminal 61*a* using screws and the second input busbar 59 may be coupled to the second protrusion of the second switch terminal 61*b* using screws.

When an error occurs in a device including a switching module in the power pack 13, the bypass switch 61 may electrically short-circuit between the first and second input busbars 57 and 59 so as to bypass a current from the first input busbar 57 to the second input busbar 59 via the bypass switch 61, thereby skipping (dropping) a submodule 92, 94, 96 including the corresponding power pack 13. Here, the term "skipping (dropping)" may mean that the corresponding sub-module 92, 94, 96 is not used.

A first sliding guide unit 1191 which allows the power pack 13 to be slidably drawn into the cabinet 91, 93, 95 may be provided on a top of the power pack 13, in correspondence with a sliding rail unit 68 installed on the top of the cabinet 91, 93, 95.

Likewise, a second sliding guide unit 1193 which allows the capacitor pack 55 to be slidably drawn into the cabinet 91, 93, 95 may be provided on a top of the capacitor pack 55, in correspondence with the sliding rail unit 68 installed on the top of the cabinet 91, 93, 95.

The first and second sliding guide portions 1191 and 1193 may be collectively referred to as a sliding guide unit 119. The sliding guide unit 119 may be drawn into or pulled out from the sliding rail unit 68 provided on the top of the cabinet 91, 93, 95.

Although the first sliding guide portion 1191 and the second sliding guide portion 1193 are shown on the top of the power pack 13 and on the top of the capacitor pack 55 in FIG. 4, the present invention is not limited thereto. If necessary, the first sliding guide portion 1191 and the second sliding guide portion 1193 may be alternatively provided on a bottom and/or a side of the power pack 13 and a bottom and/or a side of the capacitor pack 55, respectively, and the present invention is not limited thereto. In this case, the sliding rail unit 68 may be installed at a bottom or side portion of the cabinet 91, 93, 95.

Figure 6:
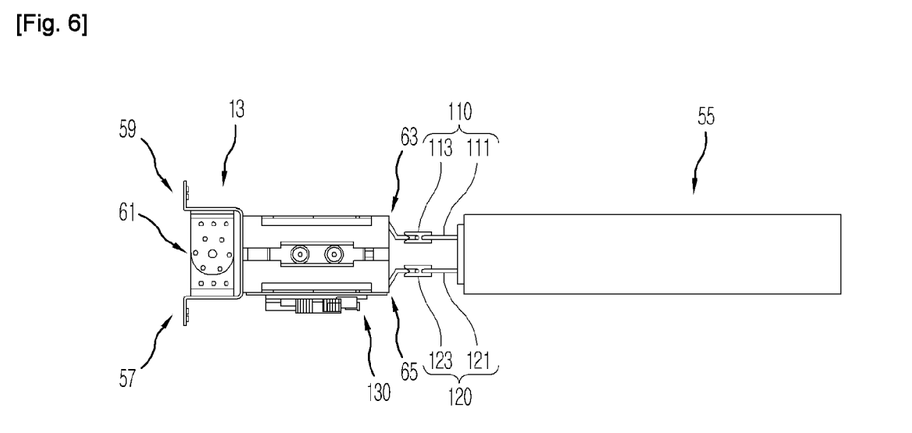
FIG. 6 is a bottom view of a submodule according to an embodiment.
Figure 7:
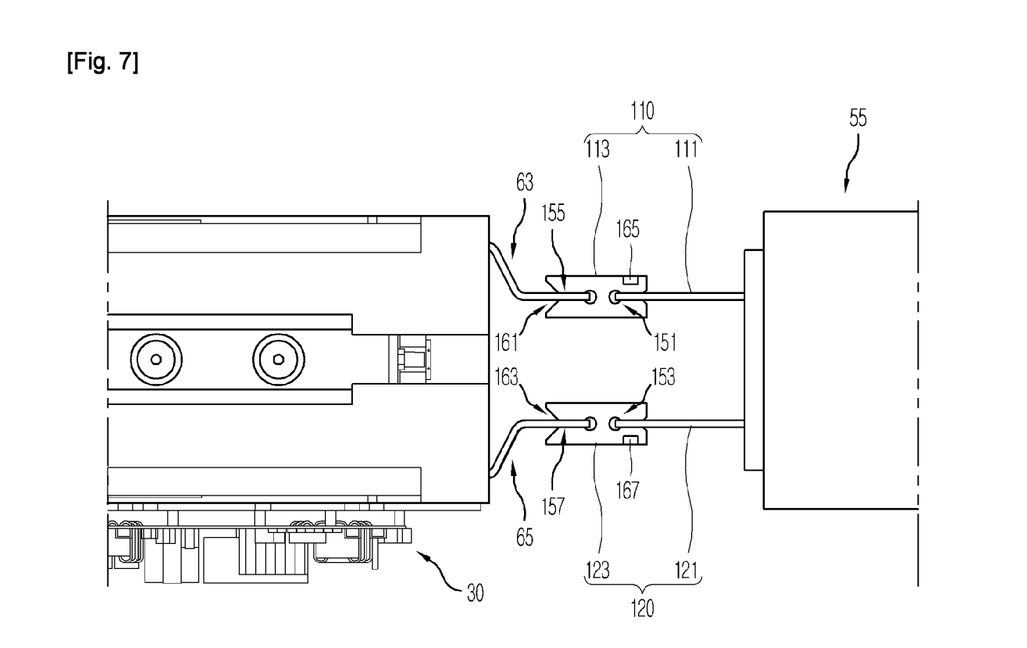
FIG. 7 is an enlarged bottom view of a submodule according to an embodiment

FIG. 6 is a bottom view of the submodule according to the embodiment, and FIG. 7 is an enlarged bottom view of the submodule according to the embodiment.

Referring to FIGS. 6 and 7, the first connection busbar 63 and the second connection busbar 65 may be provided on a rear end of the power pack 13. The first connection busbar 63 may extend from a first side portion of a rear surface of the power pack 13 toward the rear of the power pack 13. The second connection busbar 65 may extend from a second side portion of the rear surface of the power pack 13 toward the rear of the power pack 13. One side surface of the extended first connection busbar 63 may face one side surface of the extended second connection busbar 65.

For example, the first connection busbar 63 may be electrically connected to first and third switching modules of first to fourth switching modules provided in the power pack 13, and the second connection busbar 65 may be electrically connected to second and fourth switching modules of the first to fourth switching modules. The first connection busbar 63 may be coupled to a first output electrode connected to the first and second switching modules using screws and the second connection busbar 65 may be coupled to a second output electrode connected to the third and fourth switching modules using screws.

A first connection unit 110 and a second connection unit 120 may be provided at a front end of the capacitor pack 55.

The first connection unit 110 may extend forward from a first region of the capacitor pack 55. The second connection unit 120 may extend forward from a second region of the capacitor pack 55. The first region and the second region may be spaced apart from each other, for example, located at both sides of the front end of the capacitor pack 55.

The first connection unit 110 may be electrically connected to a first terminal of the capacitor element included in the capacitor pack 55 and the second connection unit 120 may be electrically connected to a second terminal of the capacitor element included in the capacitor pack 55.

The first connection unit 110 may include a first capacitor electrode 111 and a first connection electrode 113 coupled to the first capacitor electrode 111. The first capacitor electrode 111 may be a first terminal of the capacitor element. Or, the first capacitor electrode 111 may be coupled to the first terminal of the capacitor element.

The first capacitor electrode 111 may extend from the first region of the capacitor pack 55 toward the power pack 13. One side of the first capacitor electrode 111 may be coupled to the capacitor element and another side of the first capacitor electrode may be coupled to the first connection electrode 113 using a screw 165.

The first capacitor electrode 111 and the first connection electrode 113 may be made of a good conductive metallic material. The first capacitor electrode 111 and the first connection electrode 113 may contain different metallic materials. For example, the first capacitor electrode 111 may contain copper and the first connection electrode 113 may contain aluminum. The first capacitor electrode 111 and the first connection electrode 113 may contain the same metallic material. For example, the first capacitor electrode 111 and the first connection electrode 113 may contain copper.

The first capacitor electrode 111 may have a plate shape. The first connection electrode 113 may include a first coupling groove 151 provided at a first side, and a first guide groove 155 provided at a second side opposite to the first side. The first coupling groove 151 and the first guide groove 155 may be arranged on the same line. The first coupling groove 151 may be formed at the first side toward the power pack 13. The first guide groove 155 may be formed at the second side toward the capacitor pack 55.

In addition, the first connection electrode 113 may further include a first sliding guide portion 161 provided at the second side. The first sliding guide portion 161 may be connected to the first guide groove 155. The first connection busbar 63 may be guided to the first guide groove 155 by the first sliding guide portion 161 of the first connection electrode 113 and then slidably inserted into the first guide groove 155.

After the first capacitor electrode 111 is inserted into the first coupling groove 151 of the first connection electrode 113, the first capacitor electrode 111 may be coupled to the first connection electrode 113 within the first coupling groove 151 of the first connection electrode 113 using at least one screw 165.

For example, the screw 165 may be inserted through the first coupling groove 151 from a first outer surface of the first connection electrode 113 and then coupled to a second outer surface as an opposite surface of the first outer surface.

The screw 165 may alternatively penetrate through the first coupling groove 151 from the second outer surface of the first connection electrode 113.

The first capacitor electrode 111 may first be coupled to the capacitor pack 55 and then coupled to the first coupling groove 151 of the first connection electrode 113. Alternatively, the first capacitor electrode 111 may first be coupled to the first coupling groove 151 of the first connection electrode 113 and then coupled to the capacitor pack 55.

The second connection unit 120 may include a second capacitor electrode 121, and a second connection electrode 123 coupled to the second capacitor electrode 121. The second capacitor electrode 121 may be a second terminal of the capacitor element. Alternatively, the second capacitor electrode 121 may be coupled to the second terminal of the capacitor element.

The second capacitor electrode 121 may extend from a second region of the capacitor pack 55 toward the power pack 13. One side of the second capacitor electrode 121 may be coupled to the capacitor element and another side of the second capacitor electrode may be coupled to the second connection electrode 123 using a screw 167.

The second capacitor electrode 121 and the second connection electrode 123 may be made of a good conductive metallic material. The second capacitor electrode 121 and the second connection electrode 123 may contain different metallic materials. For example, the second capacitor electrode 121 may contain copper and the second connection electrode 123 may contain aluminum. The second capacitor electrode 121 and the second connection electrode 123 may include the same metallic material. For example, the second capacitor electrode 121 and the second connection electrode 123 may include copper.

The first capacitor electrode 111 and the second capacitor electrode 121 may be made of the same metallic material, but the present invention is not limited thereto. Also, the first connection electrode 113 and the second connection electrode 123 may be made of the same metallic material, but the present invention is not limited thereto.

The second capacitor electrode 121 may have a plate shape. The second connection electrode 123 may include a second coupling groove 153 provided at a first side, and a second guide groove 157 provided at a second side opposite to the first side. The second coupling groove 153 and the second guide groove 157 may be arranged on the same line. The second coupling groove 153 may be formed at the first side toward the power pack 13. The second guide groove 157 may be formed at the second side toward the capacitor pack 55.

In addition, the second connection electrode 123 may further include a second sliding guide portion 163 provided at the second side. The second sliding guide portion 163 may be connected to the second guide groove 157. The second connection busbar 65 may be guided to the second guide groove 157 by the second sliding guide portion 163 of the second connection electrode 123 and then slidably inserted into the second guide groove 157.

After the second capacitor electrode 121 is inserted into the second coupling groove 153 of the second connection electrode 123, the second capacitor electrode 121 may be coupled to the second connection electrode 123 within the second coupling groove 153 of the second connection electrode 123 using at least one screw 167. For example, the screw 167 may be inserted through the second coupling groove 153 from a first outer surface of the second connection electrode 123 and then coupled to a second outer surface as an opposite surface of the first outer surface. The second outer surface of the first coupling groove 151 and the second outer surface of the second coupling groove 153 may face each other.

The screw 167 may alternatively penetrate through the second coupling groove 153 from the second outer surface of the second connection electrode 123.

The second capacitor electrode 121 may first be coupled to the capacitor pack 55 and then coupled to the second coupling groove 153 of the second connection electrode 123. Alternatively, the second capacitor electrode 121 may first be coupled to the second coupling groove 153 of the second connection electrode 123 and then coupled to the capacitor pack 55.

The first and second connection busbars 63 and 65 of the power pack 13 may be slidably coupled to the first and second connection units 110 and 120 of the capacitor pack 55, respectively. In detail, the first connection busbar 63 of the power pack 13 may be slid into the first guide groove 155 of the first connection electrode 113 of the first connection unit 110, so as to be electrically connected to the first connection unit 110. The second connection busbar 65 of the power pack 13 may be slid into the second guide groove 157 of the second connection electrode 123 of the second connection unit 120, so as to be electrically connected to the connection unit 110.

A width of the first guide groove 155 may be equal to or smaller than a thickness of the first connection busbar 63. When the first connection busbar 63 is slid into the first guide groove 155 of the first connection electrode 113 of the first connection unit 110, the first connection busbar 63 can be strongly adhered to an inner surface of the first guide groove 155. When the first connection busbar 63 is drawn into the first guide groove 155 as much as possible, a large contact area may be made between the first connection busbar 63 and the first connection electrode 113, which may reduce contact resistance between the first connection busbar 63 and the first connection electrode 113, thereby reducing power consumption. In addition, since both side surfaces of the first connection busbar 63 in the first guide groove 155 are brought into contact with an inner surface of the first guide groove 155, the contact area can be maximized and thus the contact resistance can be reduced, thereby reducing the power consumption.

Likewise, a width of the second guide groove 157 may be equal to or smaller than a thickness of the second connection busbar 65. When the second connection busbar 65 is slid into the second guide groove 157 of the second connection electrode 123 of the second connection unit 120, the second connection busbar 65 can be strongly adhered to an inner surface of the second guide groove 157. When the second connection busbar 65 is drawn into the second guide groove 157 as much as possible, a large contact area may be made between the second connection busbar 65 and the second connection electrode 123, which may reduce contact resistance between the second connection busbar 65 and the second connection electrode 123, thereby reducing power consumption. In addition, since both side surfaces of the second connection busbar 65 in the second guide groove 157 are brought into contact with an inner surface of the second guide groove 155, the contact area can be maximized and thus the contact resistance can be reduced, thereby reducing the power consumption.

The first and second connection busbars 63 and 65 may or may not be included in the power pack 13. The first and second connection units 110 and 120 may or may not be included in the capacitor pack 55.

The above detailed description should not be limitedly construed in all aspects and should be considered as illustrative. The scope of the embodiments should be determined by rational interpretation of the appended claims, and all changes within the equivalents of the embodiments are included in the scope of the embodiments.

What is claimed is:

1. A submodule, comprising:
   a power pack including a plurality of switching modules;
   a capacitor pack extending in one direction towards the power pack, including a capacitor element and detachably connected to the power pack;
   first and second input busbars connected to the plurality of switching modules and protruding to a first outer side of the power pack, wherein the first outer side is opposite to the capacitor pack;
   first and second connection busbars connected to the plurality of switching modules and protruding to a second outer side of the power pack, wherein the second outer side faces the capacitor pack;
   first and second connection units provided at both sides of one surface of the capacitor pack, wherein the one surface of the capacitor pack faces the power pack;
   a first sliding guide unit extending along the one direction in which the capacitor pack is extended, and provided on a surface of the power pack, wherein the first sliding guide unit is configured to be drawn into or pulled out from a sliding rail unit of a cabinet; and
   a second sliding guide unit extending along the one direction in which the capacitor pack is extended, and provided on a surface of the capacitor pack, wherein the second sliding guide unit is configured to be drawn into or pulled out from the sliding rail unit of the cabinet, and
   wherein the first and second connection busbars are inserted into the first and second connection units, respectively, such that the power pack and the capacitor pack are electrically connected to each other,
   wherein the first connection unit includes:
      a plurality of first connection electrodes connected to a first terminal of the capacitor element and having the first connection busbar slidably inserted therein; and
      a first guide groove provided at one side of each of the first connection electrodes facing the power pack, and having a width that is equal to or smaller than a thickness of the first connection busbar, and
      wherein the plurality of the first connection electrodes are spaced apart from each other along the direction that the first connection busbar is extended.

2. The submodule of claim 1, wherein the first connection unit further comprises:
   a first capacitor electrode coupled to the first terminal of the capacitor element, extending from a first region of the capacitor pack toward the power pack.

3. The submodule of claim 2, wherein each of the first connection electrodes comprises:
   a first coupling groove provided at another side of each of the first connection electrodes facing the capacitor pack.

4. The submodule of claim 3, wherein the first coupling groove and the first guide groove are arranged on the same line.

5. The submodule of claim 3, wherein each of the first connection electrodes further comprises a first sliding guide portion provided at the one side and connected to the first guide groove.

6. The submodule of claim 5, wherein the first connection busbar is guided to the first guide groove by the first sliding guide portion so as to be inserted into the first guide groove.

7. The submodule of claim 3, wherein the first capacitor electrode is fixed to the first coupling groove.

8. The submodule of claim 2, wherein the second connection unit comprises:
   a second capacitor electrode coupled to a second terminal of the capacitor element and extending from a second region of the capacitor pack toward the power pack; and
   a second connection electrode coupled to the second capacitor electrode and having the second connection busbar slidably inserted therein.

9. The submodule of claim 8, wherein the second connection electrode comprises:
   a second coupling groove provided at a first side; and
   a second guide groove provided at a second side.

10. The submodule of claim 9, wherein the second connection electrode further comprises a second sliding guide portion provided at the second side and connected to the second guide groove.

11. The submodule of claim 8, wherein the first and second capacitor electrodes and the first and second connection electrodes are made of the same metallic material.

12. The submodule of claim 8, wherein the first and second capacitor electrodes and the first and second connection electrodes are made of different metallic materials.

13. The submodule of claim 12, wherein the first and second capacitor electrodes contain copper, and
   wherein the first and second connection electrodes contain aluminum.

* * * * *